(12) United States Patent
Hwang et al.

(10) Patent No.: US 9,715,289 B2
(45) Date of Patent: Jul. 25, 2017

(54) METHOD FOR MANUFACTURING A CONDUCTING SUBSTRATE

(71) Applicant: LG CHEM, LTD., Seoul (KR)

(72) Inventors: Ji Young Hwang, Daejeon (KR); Jiehyun Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 169 days.

(21) Appl. No.: 14/442,605

(22) PCT Filed: Dec. 2, 2013

(86) PCT No.: PCT/KR2013/011073
§ 371 (c)(1),
(2) Date: May 13, 2015

(87) PCT Pub. No.: WO2014/084696
PCT Pub. Date: Jun. 5, 2014

(65) Prior Publication Data
US 2016/0291709 A1     Oct. 6, 2016

(30) Foreign Application Priority Data
Nov. 30, 2012  (KR) .................... 10-2012-0138371

(51) Int. Cl.
*H05K 3/02*       (2006.01)
*H05K 3/10*       (2006.01)
*G06F 3/041*      (2006.01)

(52) U.S. Cl.
CPC .... *G06F 3/041* (2013.01); *G06F 2203/04103* (2013.01); *Y10T 29/49155* (2015.01)

(58) Field of Classification Search
CPC .. H05K 3/423; H05K 3/244; Y10T 29/49155; Y10T 29/49117; Y10T 29/49124; Y02P 70/611; C23C 18/54; B32B 2457/08
USPC .......................... 29/846, 825, 829, 841, 848
See application file for complete search history.

(56) References Cited

U.S. PATENT DOCUMENTS

| 8,747,599 B2 * | 6/2014 | Sastry ..................... C23C 18/08 156/242 |
| 2011/0168432 A1 | 7/2011 | Chun et al. |
| 2011/0279398 A1 * | 11/2011 | Philipp .................. G06F 3/044 345/174 |
| 2013/0140065 A1 | 6/2013 | Koo et al. |

FOREIGN PATENT DOCUMENTS

| KR | 10-2012-0107248 A | 10/2012 |
| WO | 2010/032975 A2 | 3/2010 |
| WO | 2010/038957 A2 | 4/2010 |
| WO | 2012/047013 A2 | 4/2012 |
| WO | 2012/121519 A2 | 9/2012 |

* cited by examiner

*Primary Examiner* — Thiem Phan
(74) *Attorney, Agent, or Firm* — Dentons US LLP

(57) ABSTRACT

A method for preparing a conducting substrate according to the present invention comprises: 1) forming a conducting pattern on a substrate; 2) forming a first darkening layer in at least a partial area on the conducting pattern by performing electroplating; and 3) forming a second darkening layer in at least a partial area on the conducting pattern by dipping the conducting pattern in an oxidizer solution.

6 Claims, 3 Drawing Sheets

[Figure 1]
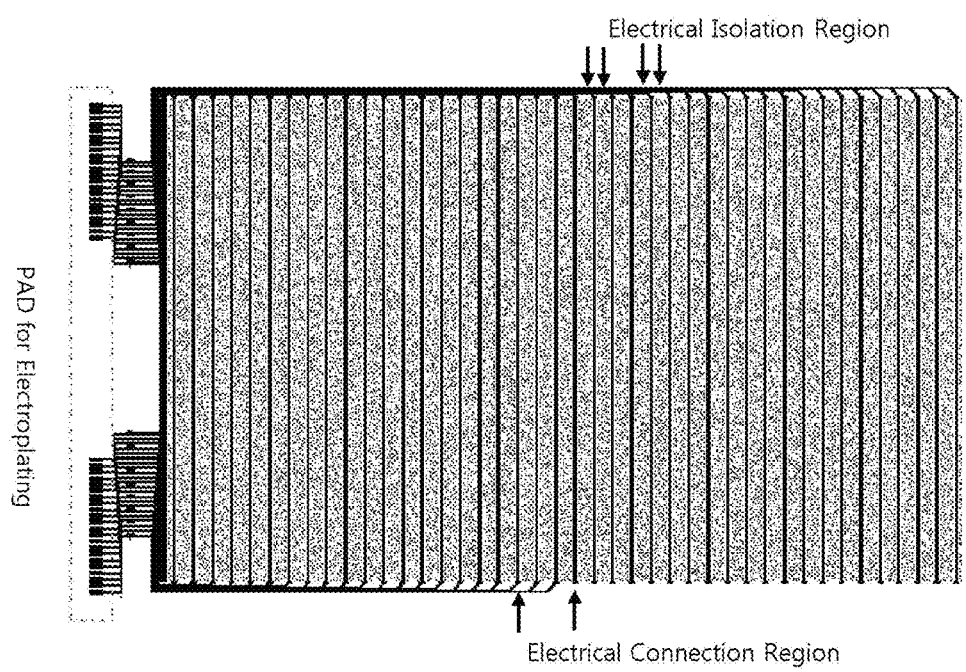

[Figure 2]
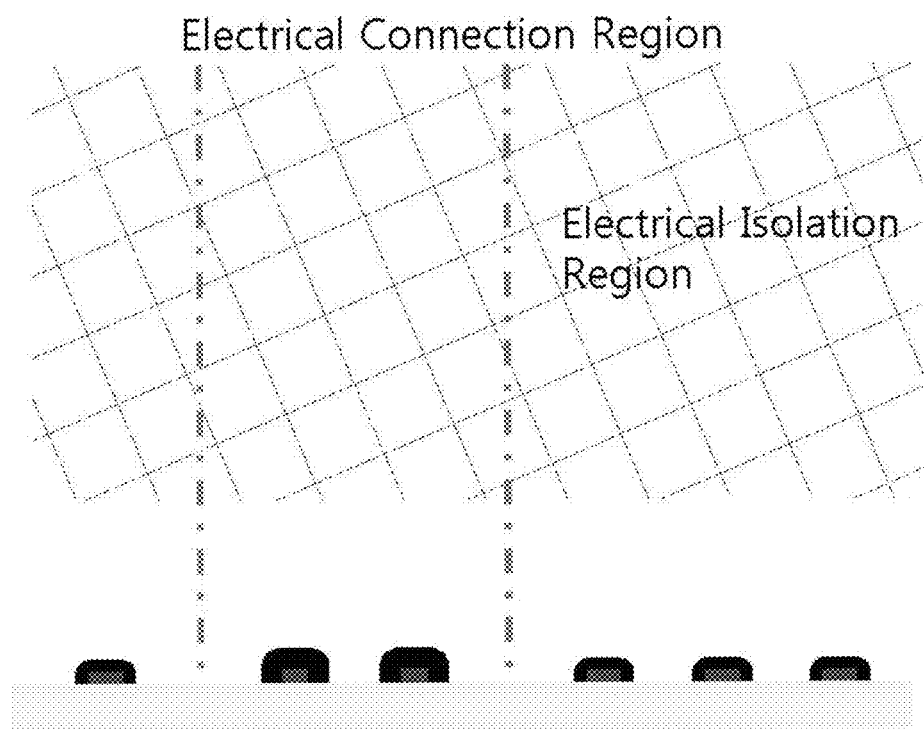

[Figure 3]
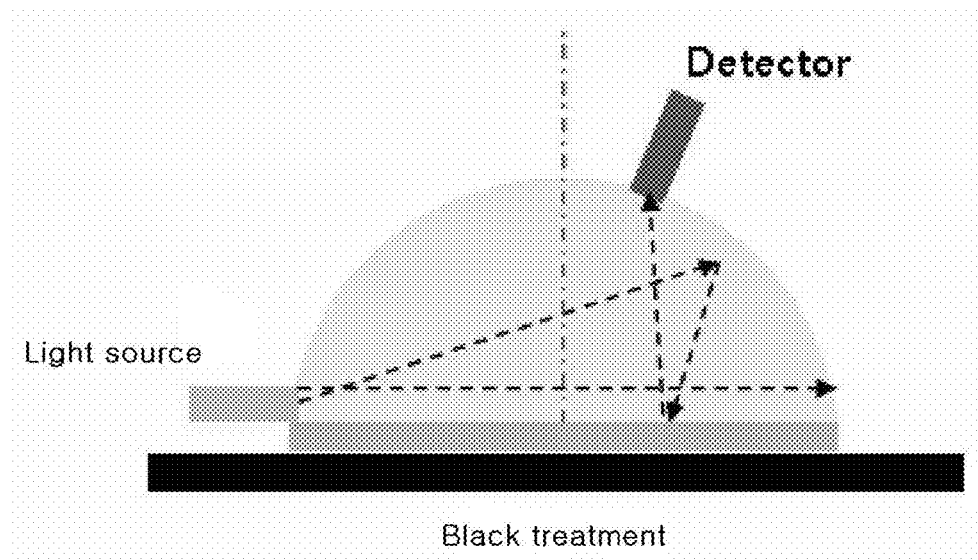

METHOD FOR MANUFACTURING A CONDUCTING SUBSTRATE

This application is a National Stage Entry of International Application No. PCT/KR2013/011073, filed Dec. 2, 2013, and claims the benefit of Korean Application No. 10-2012-0138371 filed on Nov. 30, 2012, all of which are hereby incorporated by reference in their entirety for all purposes as if fully set forth herein.

TECHNICAL FIELD

This application claims priority from Korean Patent Application No. 10-2012-0138371 filed on Nov. 30, 2012 at the KIPO, the disclosure of which is incorporated herein by reference in its entirety.

The present invention relates to a conducting substrate and a method for preparing the same.

BACKGROUND ART

In general, a touch screen may be classified as follows depending on a detection mode of signals. That is, there are a resistive type of sensing a position, which is pressed down by pressure, through a change in current or voltage value while a direct current voltage is applied thereto, a capacitive type of using a capacitance coupling while an alternating current voltage is applied thereto, an electromagnetic type of sensing a selected position as a change in voltage while a magnetic field is applied thereto, and the like.

DETAILED DESCRIPTION OF THE INVENTION

Technical Problem

Technological development for improving performance of various types of touch screens is required in the present art. In this case, in the case of a mode using not the existing indium tin oxide (ITO) but a metal fine wire for the technological development, there is a problem that a pattern is recognized due to high reflectivity of metal.

Technical Solution

The present invention provides a method for preparing a conducting substrate, comprising:
1) forming a conducting pattern on a substrate;
2) forming a first darkening layer in at least a partial area on the conducting pattern by performing electroplating; and
3) forming a second darkening layer in at least a partial area on the conducting pattern by dipping the conducting pattern in an oxidizer solution.

Further, the present invention provides a conducting substrate which is prepared by the method for preparing the conducting substrate.

Further, the present invention provides a conducting substrate, comprising:
a substrate;
a conducting pattern provided on the substrate and comprising an electrically connected region and an electrically insulated region;
a first darkening layer provided on the electrically connected region; and
a second darkening layer provided on the electrically insulated region.

Further, the present invention provides a touch screen comprising the conducting substrate.

In addition, the present invention provides a display device comprising the touch screen.

Advantageous Effects

According to the present invention, in a touch screen comprising a conducting pattern provided in an effective screen portion, a darkening layer is introduced onto a visible surface of the conducting pattern to prevent reflection by the conducting pattern without influencing conductivity of the conducting pattern and a side darkening layer of the visible surface is additionally introduced to improve a darkening degree, thereby improving concealment of the conducting pattern. In addition, it is possible to further improve a contrast feature of the touch screen by introducing the darkening layer as described above

BRIEF DESCRIPTION OF DRAWINGS

FIGS. 1 and 2 are diagrams schematically illustrating a conducting substrate according to an exemplary embodiment of the present invention.

FIG. 3 is a diagram illustrating a configuration and a scheme of a device for measuring reflectance according to an exemplary embodiment of the present invention.

BEST MODE

Hereinafter, the present invention will be described in more detail.

In general, a touch screen uses an ITO based conducting film, but there is a problem in that when ITO is applied to a large-area touch screen, a recognition speed is low due to an own RC delay. In order to solve the problem, an attempt to introduce an additional compensation chip is made, but there is a problem in that a price is increased. In order to solve the problem, many companies are developing a technology for substituting an ITO conducting film by using a metal pattern. However, this technology has disadvantages in that in the case where a general single metal is used, because of high reflectance of the metal, a pattern is recognized well by a human eye in terms of visibility and because of high reflectance and a haze value with respect to external light, glaring may occur.

Therefore, the present inventors have performed a study capable of enhancing visibility of a conducting pattern and a reflection feature for external light in a touch screen comprising the conducting pattern provided in an effective screen portion, which is distinguished from a touch screen using an ITO based conducting film in the related art.

Further, a darkening technology used in a product such as a PDP filter in the related art may be generally divided into three types. One method is an electroplating method which is performed by using a conductivity feature of metal, and this method has disadvantages in that conductivity may be granted to a darkening layer itself in the method, while a part which is electrically cut is not plated. Another method is a method that achieves darkening by oxidizing the surface of metal, and this method has a disadvantage that since darkening may be processed regardless of an electrical cutting property or not, but an oxide film is formed in a part which is darkened, and as a result, the corresponding part may not electrically conducted. The last method is an electroless plating method, and this method has a disadvantage that as pre-processing for electroless plating is required, the electroless plating method may not be applied to a thin film having a small thickness and moreover, an additional pre-processing process for increasing a low electroless plating time and a layer corresponding to a seed of electroless plating is required.

In order to solve the disadvantage, a method in which the entirety of metal is darkened through electroplating may be provided, and in this case, there is a disadvantage that in an actual preparing process of a touch screen using a fine metal wire, a part electrically connected with the fine metal wire and a part electrically insulated from the fine metal wire coexist, and as a result, it is impossible to darken the part which is electrically insulated when the electroplating is used. Further, when oxidation of metal is used, there is a disadvantage that electrical contact may not be finally achieved due to oxidation of the surface of a portion connected to other apparatuses by using a component such as a flexible printed circuit board (FPCB).

Therefore, in order to solve the aforementioned problems, the present invention has been made in an effort to provide a method for darkening a contacting pattern provided on a substrate by mixing electroplating and an oxidation method of metal.

A method for preparing a conducting substrate according to an exemplary embodiment of the present invention comprises: 1) forming a conducting pattern on a substrate; 2) forming a first darkening layer in at least a partial area on the conducting pattern by performing electroplating; and 3) forming a second darkening layer in at least a partial area on the conducting pattern by dipping the conducting pattern in an oxidizer solution.

In the present invention, the darkening layer does not mean that a color or absorbance of a layer configuring the darkening layer shows a black color itself, but means a layer that enables the characteristic that a viewed color is darkened due to reflectivity and a light absorbing feature when the darkening layer is laminated with metal constituting a conducting layer, and a pattern configured therethrough.

In the present invention, in the touch screen comprising the conducting pattern provided on an effective surface portion, it was found that light reflection by the conducting pattern mainly affects visibility of the conducting pattern, and the present invention has been made in an effort to improve the problem. In detail, in the existing ITO-based touch screen, because of high transmittance of the ITO itself, a problem due to the reflectance of the conducting pattern was not significantly shown, but it was found that the reflectance and the light absorbing feature of the conducting pattern exert a key influence on awareness of a line in the touch screen comprising the conducting pattern provided in the effective screen portion.

In detail, when the darkening layer is bonded to a layer having the high reflectance such as the conducting pattern, the darkening layer has destructive interference and self-light absorbance under a specific thickness condition and thus exhibits an effect of reducing the reflectance by the conducting pattern by similarly adjusting quantities of light reflecting on the darkening layer and light reflecting on the conducting pattern through the darkening layer and, and at the same time, guiding destructive interference between two lights under the specific thickness condition. In this case, the darkening layer preferably has lower reflectance than the conducting pattern. Whereby, the reflectance of light may be lowered compared to the case where a user directly looks at the conducting pattern, and thus the visibility of the conducting pattern may be greatly lowered.

In the present invention, the material of the substrate may be appropriately selected according to the field desired to apply the conducting substrate according to the present invention, and as preferable examples thereof, there are a glass or an inorganic material substrate, a plastic substrate or a film, but the material is not limited thereto.

The conducting pattern may comprise a pattern formed by a conducting metal wire. It is preferable that the material of the conducting pattern has excellent conductivity and is easily etched.

In general, the material having excellent conductivity has a disadvantage in that reflectance is high. However, in the present invention, it is possible to form the conducting pattern using the material having high reflectance by using the darkening layer. In the present invention, even though the material having the total reflectance of 70 to 80% or more is used, it is possible to decrease the total reflectance, decrease visibility of the conducting pattern, and maintain or improve a contrast characteristic through the darkening layer.

Specific examples of the material of the conducting pattern preferably comprise a single film or a multilayered film comprising gold, silver, aluminum, copper, neodymium, molybdenum, nickel, or an alloy thereof. Herein, the thickness of the conducting pattern is not particularly limited, but is preferably 0.01 to 10 μm in terms of the conductivity of the conducting pattern and the economic efficiency of the forming process thereof.

In the present invention, the conducting pattern may comprise an electrically connected region and an electrically insulated region, and the first darkening layer may be formed on the electrically connected region and the second darkening layer may be formed on the electrically insulated region.

The first darkening layer and the second darkening layer preferably have a color which is close to an achromatic color. However, the color is not necessarily the achromatic color, and the layers may be introduced as long as the layers have low reflectance even though the darkening layer has a color. In this case, the achromatic color means a color exhibited when light, which is incident on a surface of an object, is not selectively absorbed but evenly reflected and absorbed with respect to a wavelength of each component. In the present invention, the first darkening layer and the second darkening layer preferably use a material having a standard deviation of total reflectance for each wavelength band of 50% or less at the time of measuring the total reflectance in a visible light area 400 to 800 nm.

The material of the first darkening layer and the second darkening layer is a light absorbing material, and the material may be preferably used without a particular limitation as long as the material is made of metal, metal oxide, metal nitride or metal oxynitride having the aforementioned physical properties when the entire surface layer is formed. For example, the darkening layer may be an oxide film, a nitride film, an oxynitride film, a carbide film, a metal film and a combination thereof, which comprise Ni, Mo, Ti, Cr, Al, Cu, Fe, Co, V, Au, Ag, and the like.

In the present invention, the first darkening layer may be formed by electroplating. As an exemplary embodiment, when the conducting pattern comprises Cu, the electroplating may be performed by using Ni, Cr, or the like, and as a result, when the first darkening layer is formed, a problem is not caused in an electrical contact feature at the time of bonding the flexible printed circuit board (FPCB), which is a subsequent process. This is because the electroplating is performed by using an electrode pad area for the electroplating and in this case, plating is not performed in a pad part. Further, when an environmental aspect is considered, the electroplating is preferably performed through Ni in the case where the conducting pattern comprises Cu.

In the present invention, the second darkening layer may be formed by forming the first darkening layer and then dipping the first layer in an oxidizer solution. As the oxidizer solution, any material may be used without a limitation as long as the material may oxidize and darken metal configuring the conducting pattern. In more detail, NaOH, or the like may be used, but the material is not limited thereto.

As an exemplary embodiment according to the present invention, when the conducting pattern comprises Cu, the first darkening layer is formed by electroplating of Ni, and the second darkening layer is formed through impregnation in NaOH, Ni of the first darkening layer does not react to NaOH, while only an electrically insulated part where the conducting pattern is not electroplated reacts to NaOH, thereby achieving darkening. Since the electrically insulated part is irrelevant to an electrical contact, forming an insulating layer is not interrupted by oxidization.

In the present invention, when the conducting pattern comprises Cu, a darkening material is additionally provided on Cu basically in the case of the electroplating, while when the oxidization is used, Cu itself is changed to CuO, and as a result, a thickness difference minutely occurs depending on the area in a cross-sectional shape of the conducting substrate and an additional pad area for electroplating may exist in the case of an intermediate product.

In the present invention, the method may further comprise forming a third darkening layer on the substrate, before the forming of the conducting pattern on the substrate. That is, the darkening layer is primarily formed on the substrate, metal for the conducting pattern is deposited and patterned, and then the first darkening layer and the second darkening layer may be formed. The conducting substrate prepared as above may comprise darkening layers on four planes of the conducting pattern.

The third darkening layer may be formed by forming a third darkening layer by using a deposition method, for example, a method such as a sputtering method, a CVD (chemical vapor deposition) method, a thermal evaporation method, and an e-beam deposition method, and then patterning the third darkening layer. In particular, in the case where the sputtering method is used, a flexible property of the third darkening layer pattern is excellent. In the thermal evaporation method and the e-beam deposition method, particles are simply stacked, but the sputtering method is characterized in that particles form a nucleus by collision and even though the nucleus grows and is bent, mechanical properties are excellent. In addition, in the case where the sputtering method is used, an interface adhesive force between the third darkening layer pattern and another layer is excellent. By using the deposition method as described above, without using an adhesion layer or an adhesive layer, the third darkening layer pattern may be directly formed on the substrate, and a desired thickness and a desired pattern shape may be implemented.

Further, the third darkening layer may also be formed by a photolithography method or a printing method.

The third darkening layer may be directly provided on the substrate without intervening the adhesive layer or the adhesion layer. The adhesion layer or the adhesive layer may affect durability or optical properties. That is, a method for preparing the third darkening layer according to the present invention is fully different from the case of forming the darkening layer on the substrate by using an adhesion layer or an adhesive layer in the related art. Moreover, as compared to the case where the adhesion layer or the adhesive layer is used, in the present invention, interface properties between the substrate or the conducting pattern and the third darkening layer pattern are excellent.

Further, the present invention provides a conducting substrate which is prepared by the method for preparing the conducting substrate.

Further, the conducting substrate according to the present invention comprises: a substrate; a conducting pattern provided on the substrate and comprising an electrically connected region and an electrically insulated region; a first darkening layer provided on the electrically connected region; and a second darkening layer provided on the electrically insulated region.

In the conducting substrate according to the present invention, since the contents of the substrate, the conducting pattern, the first darkening layer, and the second darkening layer are the same as those described above, a detailed description thereof will be omitted.

In the present invention, the first darkening layer or the second darkening layer may be provided on at least a part of an upper surface and a side of the conducting pattern.

In the present invention, the thickness of a layer comprising the conducting pattern and the first darkening layer may be different from that of a layer comprising the conducting pattern and the second darkening layer. In particular, a sum of thicknesses of the second darkening layer and the conducting pattern with the second darkening layer may be smaller than that of the conducting pattern with the first darkening layer.

In the present invention, the first darkening layer may contact at least a part of a remaining surface of the conducting pattern other than a surface of the conducting pattern contacting the substrate. Further, illuminance of the second darkening layer may be 200 nm or more, but is not limited only thereto.

The first darkening layer and the second darkening layer may comprise different materials.

Further, the thickness of the conducting pattern with the first darkening layer may be 2 μm or more, but is not limited only thereto.

In an initial substrate material for forming the conducting substrate according to the present invention, in a color range of a pattern region constituted by the first darkening layer or the second darkening layer and the conducting pattern, which is measured on a surface where the first darkening layer or the second darkening layer of the conducting substrate is viewed, a value of L may be 20 or less, a value of A may be −10 to 10, and a value of B may be −70 to 70, the L value may be 10 or less, the A value may be −5 to 5, and the B value may be 0 to 35, or the L value may be 5 or less, the A value may be −2 to 2, and the B value may be 0 to 15, based on a CIE LAB color coordinate.

Total reflectance of the pattern region constituted by the first darkening layer or the second darkening layer and the conducting pattern, which is measured on the surface where the first darkening layer or the second darkening layer of the conducting substrate is viewed, may be 17% or less, 10% or less, or 5% or less based on 550 nm.

The total reflectance is a value observed by setting the reflectance of an opposite surface of a plane to be measured in term of a plane for measuring reflectance by using a black paste, a tape or the like to 0 and then measuring only the reflectance of the surface to be measured, and in this case, a diffuse light source that is most similar to the ambient light condition is selected as the incident light source. Further, in this case, the position for measuring the reflectance is based on a position that is inclined at about 7° from a horizontal line of a hemisphere of an integrating sphere. FIG. 3 illustrates a configuration and a scheme of a device for measuring the reflectance.

As an exemplary embodiment of the present invention, in a touch screen manufactured by laminating two conducting substrates in which the first darkening layer, the second darkening layer, and the conducting pattern are formed through a patterning process by using optically cleared adhesive (OCA) and thereafter, laminating the conducting substrates on tempered glass, the full reflectance may be 6% or less or 6%, 5%, or 4% in a reference sample having transmittance of 89%.

In this, transmittance and total reflectance have an interrelation and the interrelation has a relation in which the total reflectance increases as the transmittance decreases, and as a result, a relational expression between transmittance and total reflectance of one substrate while the pattern exists will be described in Equations 1 and 2 below.

Transmittance of substrate=transmittance of substrate itself×(aperture area ratio) [Equation 1]

Total reflectance of substrate=reflectance of substrate itself×(aperture area ratio)+total reflectance of metal itself×(closed area ratio by metal wire) [Equation 2]

In this case, the reflectance of the substrate itself means reflectance of the substrate while no fine metal wire exists.

Further, a relational expression for the transmittance of the substrate itself will be described in Equation 3 below.

Transmittance of substrate itself=100−reflectance of substrate itself−absorbance of substrate itself [Equation 3]

Therefore, an interrelation between the total reflectance and the transmittance while the pattern exists will be described in Equation 4 below.

Total reflectance=(100−transmittance of substrate itself−absorbance of substrate itself)×aperture area ratio+total reflectance of metal itself× (closed area ratio by metal wire) [Equation 4]

In this case, a sum of the aperture area ratio and the closed area ratio is 1.

Therefore, Equation 4 above may be described as Equation 5 below.

Total reflectance=(100−transmittance of substrate itself−absorbance of substrate itself)×(transmittance of substrate/transmittance of substrate itself)+total reflectance of metal itself×(1−transmittance of substrate/transmittance of substrate itself) [Equation 5]

Therefore, the total reflectance has a linear relationship in which the total reflectance decreases as the transmittance of the substrate increases.

In the touch screen according to the present invention, the first darkening layer or the second darkening layer comprises a first surface contacting the conducting pattern and a second surface facing the first surface, and when the total reflectance of the conducting substrate is measured at the second surface side of the first darkening layer or the second darkening layer, the total reflectance $Rt$ of the conducting substrate may be calculated by Equation 6 below.

Total reflectance $Rt$ of touch window using one substrate=touch tempered glass+reflectance (reflectance of film when surface is film) of bare substrate×aperture ratio+reflectance of darkening layer×close ratio [Equation 6]

In addition, in the case where two kinds of conducting substrates are laminated in the constitution of the touch screen, the total reflectance ($Rt$) of the conducting substrate may be calculated by Equation 7 below.

Total reflectance $Rt$=touch tempered glass+reflectance (reflectance of film when surface is film) of laminate of two bare substrates×aperture ratio+close ratio of laminate of two substrates with pattern×reflectance of darkening layer [Equation 7]

Therefore, a difference between a case in which the first darkening layer or the second darkening layer is present and a case in which the first darkening layer or the second darkening layer is not present depends on the reflectance of the first darkening layer or the second darkening layer, and from this point of view, the total reflectance may be decreased by 15 to 20%, 20 to 30%, or 30 to 50%, as compared with total reflectance R0 of the conducting substrate having the same configuration except that the first darkening layer or the second darkening layer is not present. Actually, the effect enables a product having lower reflectance than the laminate using a bare substrate without a pattern and a conductor to be implemented because the darkening layer and the conducting pattern exist. However, the reflectance of approximately maximum 50% may be reduced from the reduction effect by minimum 15% which is a reference of approximately 88% transmittance as compared to the total reflectance R0 of the conducting substrate having the same configuration except that there is no darkening layer exists as described above.

In the touch screen according to the present invention, the first darkening layer or the second darkening layer comprises a first surface contacting the conducting pattern and a second surface facing the first surface, and when the total reflectance of the conducting substrate is measured at the second surface side of the first darkening layer or the second darkening layer, a difference between the total reflectance Rt of the conducting substrate and the total reflectance R0 of the substrate may be 50% or less, 30% or less, 20% or less, or 10% or less.

In the touch screen according to the resent invention, the touch screen may further comprise a substrate provided at one side of the constructing substrate, and when the total reflectance of the substrate provided on the conducting substrate is measured at the substrate side, a difference from the total reflectance of the substrate may be 50% or less, 30% or less, 20% or less, or 10% or less.

Herein, the total reflectance represents total reflectance of the touch screen itself comprising the first darkening layer and the second darkening layer.

In the present specification, when the incident light is 100%, the total reflectance is preferably a value measured on the basis of the value of wavelength of 550 nm among reflected lights reflected by a target layer or a laminate on which light is incident, and this is because the total reflectance of the wavelength of 550 nm is not largely different from the entire total reflectance in general. For example, after the entire surface darkening layer is formed by using a method for depositing a material constituting the darkening layer on the substrate, for example, a sputtering method, a CVD (chemical vapor deposition) method, a thermal evaporation method, and an e-beam deposition method, or the like, reflectance (550 nm) of visible rays that are incident from the air side may be measured. In this case, on the rear surface of the substrate, that is, on a surface on which the darkening layer is not formed, reflection on the rear surface of the substrate may be removed by performing the entire surface black processing. As the substrate, a transparent substrate may be used, but the substrate is not particularly limited, and for example, glass, a plastic substrate, and a plastic film may be used.

In the touch screen according to the present invention, a haze value of the conducting substrate may be 5% or less, 3% or less, or 1.5% or less.

The light absorbance of the entire surface layer made of the material constituting the darkening layer is not particularly limited, but may be 15% or less, 30% or less, or 40% or less.

Further, the light transmittance of the entire surface layer made of the material constituting the darkening layer is not particularly limited, but may be 80% or more in order to use the entire layer as the touch screen.

In the present invention, the first darkening layer and the second darkening layer are provided in a region corresponding to the conducting pattern. Herein, the region corresponding to the conducting pattern represents the region that has a pattern having the same shape as the conducting pattern. However, pattern scales of the first darkening layer and the second darkening layer need not be completely the same as that of the conducting pattern and a case where line widths of the first darkening layer and the second darkening layer are smaller or larger than a line width of the conducting pattern is also comprised in the scope of the present invention. For example, the first darkening layer and the second darkening layer may have an area which is 80% to 120% of an area in which the conducting pattern is provided.

The first darkening layer and the second darkening layer may have a pattern shape having a line width which is equal to or larger than that of the conducting pattern.

When the first darkening layer and the second darkening layer have a pattern shape having a line width which is larger than that of the conducting pattern, the first darkening layer and the second darkening layer may more greatly impart an effect of concealing the conducting pattern when viewed by a user, and thus there is an advantage in that the first darkening layer and the second darkening layer may efficiently block an effect caused by luster or reflection of the conducting pattern itself. However, although the line widths of the first darkening layer and the second darkening layer are the same as the line width of the conducting pattern, an effect to be targeted by the present invention may be achieved.

In the present invention, the line width of the conducting pattern may be 10 µm or less, 0.1 to 10 µm, 0.2 to 8 µm, or 1 to 5 µm. The thickness of the conducting pattern may be 10 µm or less, 2 µm or less, or 10 to 300 nm.

The aperture ratio of the conducting pattern, that is, the ratio of an area that is not covered by the pattern, may be 70% or more, 85% or more, and 95% or more. Furthermore, the aperture ratio of the conducting pattern may be from 90% to 99.9%, but is not limited thereto.

The conducting pattern may be a regular pattern or an irregular pattern.

As the regular pattern, a pattern shape of the art such as a mesh pattern may be used. The irregular pattern is not particularly limited, but may also be a boundary line shape of figures constituting a Voronoi diagram. When both an irregular pattern and a darkening layer are used in the present invention, a diffraction pattern of reflection light caused by illumination having directivity may be removed by the irregular pattern, and an influence by scattering of light may be minimized by the darkening layer, thereby minimizing a problem in visibility.

In the exemplary embodiment of the present invention, the conducting pattern is a regular pattern and comprises cross points formed by crossing a plurality of arbitrary lines among lines constituting the conducting pattern, and in this case, the number of cross points may be 3,000 to 122,500, 13,611 to 30,625, and 19,600 to 30,625 in an area of 3.5 cm×3.5 cm. Further, according to the exemplary embodiment of the present invention, when the conducting pattern is provided in the display, it was confirmed that the optical property of the display is not largely impaired when the number of cross points is 4,000 to 123,000.

Further, in the exemplary embodiment of the present invention, the conducting pattern is an irregular pattern and comprises cross points formed by crossing a plurality of arbitrary lines among lines constituting the conducting pattern, and in this case, the number of cross points may be 6,000 to 245,000, 3,000 to 122,500, 13,611 to 30,625, and 19,600 to 30,625 in an area of 3.5 cm×3.5 cm. Further, according to the exemplary embodiment of the present invention, when the conducting pattern is provided in the display, it was confirmed that the optical property of the display is not largely impaired when the number of cross points is 4,000 to 123,000.

The pitch of the conducting pattern may be 600 µm or less and 250 µm or less, but the pitch may be adjusted according to transmittance and conductivity desired by the person skilled in the art.

The conducting pattern used in the present invention is appropriately a material having specific resistance of $1 \times 10^6$ ohm·cm to $30 \times 10^6$ ohm·cm, and more preferably $7 \times 10^6$ ohm·cm or less.

In the present invention, surface resistance of the conducting substrate may be 1 to 300 ohm/square. The surface resistance within the aforementioned range is advantageous for operating the touch screen.

The conducting substrate according to an exemplary embodiment of the present invention is illustrated in FIGS. 1 and 2.

The touch screen according to the present invention may further comprise a conducting substrate comprising an additional darkening layer in addition to the conducting substrate comprising the substrate, a conducting pattern, the first darkening layer, and the second darkening layer which are described above. In this case, the conducting substrates comprising the darkening layer may be disposed in different directions with the conducting pattern as the center. Conducting substrates comprising two or more conducting substrates that may be comprised in the touch screen of the present invention need not have the same structure, and any one and preferably only the conducting substrate at a side that is closest to the user may comprise the substrate, the conducting pattern, and the darkening layer, and the additionally comprised conducting substrate may not comprise the darkening layer.

In addition, in the touch screen according to the present invention, the conducting pattern and the darkening layer may be provided on both surfaces of the board.

Total reflectance of the touch screen comprising the conducting substrate according to the present invention may be 12% or less, 7% or less, 5% or less, or 2% or less.

In the present invention, the first darkening layer is formed by the electroplating such that an additional layer is deposited on the conducting pattern, and as a result, the thickness of the film is increased. Further, in the case of the second darkening layer, since darkening is achieved through an oxidizing process of the existing formed film, the second darkening layer and the first darkening layer are different in that the thickness of a previously formed conducting pattern is decreased. That is, in the present invention, the thickness of the first darkening layer may be larger than that of the second darkening layer.

In the present invention, the first darkening layer and the second darkening layer may be different from each other in a darkening level by a darkening method. In general, the difference in darkening level may be approximately 10% in reflectance due to the difference between a darkening method by oxidization and a darkening method by the electroplating, but the present invention is not limited only thereto.

The touch screen according to the present invention may further comprise an electrode portion or a pad portion in addition to an effective screen portion where the conducting pattern is formed on the conducting substrate, and in this case, the effective screen portion and the electrode portion/the pad portion may be constituted by the same conductor and have the same thickness, such that there may be no joints therebetween.

In the touch screen according to the present invention, a protection film, a polarizing film, an antireflection film, an antiglare film, a fingerprint-resistant film, a low reflection film or the like may be provided on one surface of each substrate.

Further, the touch screen according to the present invention comprises the conducting substrate. For example, the conducting substrate body according to the exemplary embodiment of the present invention may be used as a touch-sensitive type electrode substrate in a capacitance type touch screen.

The touch screen according to the exemplary embodiment of the present invention may comprise: a lower substrate; an upper substrate; and an electrode layer provided on any one surface of a surface of the lower substrate that is in contact with the upper substrate and a surface of the upper substrate that is in contact with the lower substrate or both the surfaces. The electrode layer may perform a function of transmitting and receiving signals for detecting the X axis and Y axis positions.

In this case, one or both of the electrode layer provided on the lower substrate and the surface of the lower substrate that is in contact with the upper substrate and the electrode layer provided on the upper substrate and the surface of the upper substrate that is in contact with the lower substrate may be the conducting substrate according to the exemplary embodiment of the present invention. In the case where only any one of the electrode layers is the conducting substrate according to the present invention, the other one may have the pattern known in the art.

When an electrode layer is provided on one surface of both the upper substrate and the lower substrate to form an electrode layer having two layers, an insulation layer or a spacer may be provided between the lower substrate and the upper substrate so that the interval between the electrode layers is constantly maintained and a connection therebetween thereof does not occur. The insulation layer may comprise an adhesive or an UV or thermally curable resin.

The touch screen may further comprise a ground portion that is connected to the conducting pattern as described above. For example, the ground terminal portion may be formed at a rim portion of a surface of the substrate on which the conducting pattern is formed. Further, at least one of an antireflection film, a polarizing film, and a fingerprint resistant film may be provided on at least one surface of the laminate comprising the conducting substrate. A different type of functional film may be further comprised in addition to the above-described functional film depending on the design specification. A touch panel may be applied to display devices such as an OLED display panel (PDP), a liquid crystal display (LCD), a cathode-ray tube (CRT), and a PDP.

In addition, the present invention provides a display device comprising the touch screen. The display device may comprise the aforementioned touch screen and a display module.

According to the present invention, it is advantageous that all of three surfaces exposing the conducting pattern such as metal may be darkened, and as compared with a case in which only one surface exposed on the surface of the existing conducting pattern is darkened, three surfaces of the conducting pattern are darkened reflectance of 550 nm at a level of 7% when one film is attached to a cover window, and as a result, it is characterized that the reflectance is decreased to approximately 4%. Further, according to the present invention, since a part corresponding to a dummy pattern is darkened by oxidization, an electric floating gate may be suppressed from being formed, thereby improving touch performance. Further, there is advantage that as technology that may be applied to a pattern having various high differences, side darkening may be easily achieved as compared with the existing preparation method.

Hereinafter, the present invention will be described in more detail with reference to an Example. However, the following Example is set forth to illustrate the present invention, but the scope of the present invention is not limited thereto.

Example

Printing was performed by sputtering Cu or using a reverse offset process by using a Cu layer (Cu deposited film made by Toray) formed on polyethylene terephthalate (PET) that is previously sold. In this case, a film having a thickness of 2 μm as the thickness of Cu was used.

After the printing was performed, a corresponding Cu material was etched by using an iron chloride based etching solution and thereafter, was subjected to black nickel electroplating under the condition of ph 4.2 at 65° C. under a condition of 0.1 A/m$^2$.

Thereafter, the formed pattern an alkali deposited degreasing solution of Melplate and soft etching was weakly subjected through sulfuric acid again and thereafter, was impregnated with a darkening solution of Melplate to be darkened.

According to the present invention, in a touch screen comprising a conducting pattern provided in an effective surface portion, a darkening layer is introduced onto a visible surface of the conducting pattern to prevent reflection by the conducting pattern without influencing conductivity of the conducting pattern and a side darkening layer of the visible surface is additionally introduced to improve a darkening degree, thereby improving concealment of the conducting pattern. In addition, it is possible to further improve a contrast feature of the touch screen by introducing the darkening layer as described above.

The invention claimed is:
1. A method for preparing a conducting substrate, comprising:
   1) forming a conducting pattern on a substrate, wherein the conducting pattern comprises an electrically connected region and an electrically insulated region;
   2) forming a first darkening layer on the electrically conducted region of the conducting pattern by performing electroplating; and

3) forming a second darkening layer on the electrically insulated region of the conducting pattern by dipping the conducting pattern in an oxidizer solution.

2. The method of claim 1, wherein the conducting pattern comprises a pattern formed by a conducting metal wire.

3. The method of claim 1, wherein the first darkening layer or the second darkening layer comprises one or more selected from the group consisting of metal, an alloy of metal, oxide of metal, nitride of metal, oxyntride of metal, and carbide of metal.

4. The method of claim 3, wherein the metal comprises one or more selected from the group consisting of Ni, Mo, Ti, Cr, Al, Cu, Fe, Co, Ti, V, Au, and Ag.

5. The method of claim 1, further comprising:
forming a third darkening layer on the substrate, before the forming of the conducting pattern on the substrate.

6. The method of claim 5, wherein the third darkening layer is formed on the substrate by a deposition method, a photolithography method, or a printing method.

* * * * *